US010012987B2

(12) United States Patent
Shem Tov et al.

(10) Patent No.: US 10,012,987 B2
(45) Date of Patent: Jul. 3, 2018

(54) AUTONOMOUS VEHICLE

(71) Applicant: MOTOROLA SOLUTIONS, INC, Chicago, IL (US)

(72) Inventors: Jacob Shem Tov, Jerusalem (IL); Kiril Danilchenko, Beer Sheva (IL); Aya Korine, Netanya (IL); Yossi Mizrahi, Rishon-Letzion (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/361,513

(22) Filed: Nov. 28, 2016

(65) Prior Publication Data
US 2018/0150076 A1 May 31, 2018

(51) Int. Cl.
*G05D 1/00* (2006.01)
*G05D 1/02* (2006.01)
(52) U.S. Cl.
CPC ......... *G05D 1/0088* (2013.01); *G05D 1/0212* (2013.01); *G05D 1/0278* (2013.01)
(58) Field of Classification Search
CPC ... G05D 1/0088; G05D 1/0212; G05D 1/0278
USPC .......................................................... 701/23
See application file for complete search history.

(56) References Cited

U.S. PATENT DOCUMENTS

| | | | |
|---|---|---|---|
| 8,429,947 B2 | 4/2013 | Akimoto et al. | |
| 9,841,767 B1* | 12/2017 | Hayward | G05D 1/0278 |
| 2011/0238292 A1* | 9/2011 | Bresnahan | G01C 21/3407 |
| | | | 701/533 |
| 2015/0285645 A1 | 10/2015 | Maise et al. | |
| 2015/0321641 A1 | 11/2015 | Abou et al. | |

OTHER PUBLICATIONS

The International Search Report and the Written Opinion, corresponding patent application No. PCT/US2017/060500 filed Nov. 8, 2017, dated Jan. 2, 2018, all pages.

* cited by examiner

*Primary Examiner* — Yazan A Soofi

(57) ABSTRACT

An autonomous vehicle is provided herein. During operation, a person (e.g., a public-safety officer) will be assigned a task or mission that is identified by an identifier (e.g., an incident identifier, public-safety incident identifier, or an incident type). The incident identifier will be provided to the autonomous vehicle, and the autonomous vehicle will choose to "follow" the officer or not based on the incident identifier. Because the autonomous vehicle described above will only "follow" the officer for certain incident types, the officer will be able to perform many of their tasks without the annoyance of an automobile following them.

11 Claims, 3 Drawing Sheets

AUTONOMOUS VEHICLE

FIELD OF THE INVENTION

The present invention generally relates to autonomous vehicles, and more particularly to an autonomous vehicle that chooses to move based upon a public-safety assignment/incident type.

BACKGROUND OF THE INVENTION

Autonomous vehicles are becoming more common. Everything from pizza delivery to taxi service can now be provided via autonomous vehicles. With this in mind, it would be advantageous to provide public-safety officers with an autonomous vehicle to aide in performing their job. However, simply having a vehicle follow an officer every time they leave their vehicle will be problematic. For example, if an officer enters a shopping mall, it is not necessary to have the officer's vehicle roam the parking lot "following" the officer as the officer patrols the mall. However, if the officer makes an arrest while on patrol, it may be advantageous to the officer if the vehicle moved to the closes exit. Therefore, a need exists for an autonomous vehicle that alleviates the above-mentioned issues.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, an autonomous vehicle is provided herein. During operation, a person (e.g., a public-safety officer) will be assigned a task or mission that is identified by an identifier (e.g., an incident identifier, public-safety incident identifier, or an incident type). The incident identifier will be provided to the autonomous vehicle, and the autonomous vehicle will choose to "follow" the officer or not based on the incident identifier. Because the autonomous vehicle described above will only "follow" the officer for certain incident types, the officer will be able to perform many of their tasks without the annoyance of an automobile following them.

As one of ordinary skill in the art will recognize, an incident identifier comprises a record of a particular incident, that typically, at a minimum, includes the location, type, severity, and date/time attributes of the incident. Additional environmental factors may also be included in the incident identifier (e.g., the weather at the time of the incident, etc).

Figure 1:
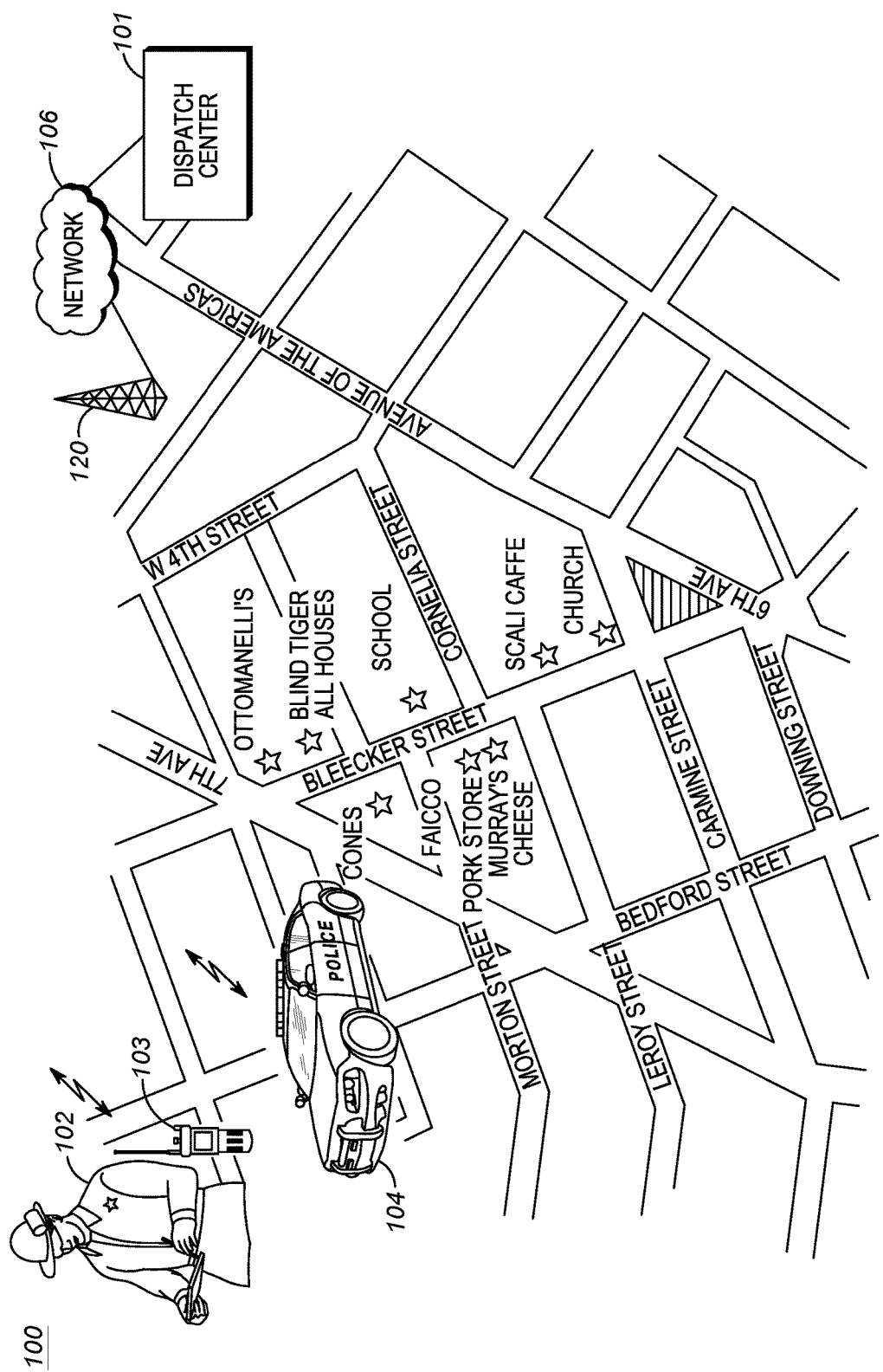
FIG. 1 is a block diagram showing a general operational environment.

Turning now to the drawings wherein like numerals designate like components, FIG. 1 is a block diagram showing a general operational environment 100 for employment of the present invention. Environment 100 may comprise a geographic area 100 assigned to officer 102 for patrolling. Patrolling may take place with officer 102 driving public-safety vehicle 104 (in this example, an automobile) through area 100.

Device 103 can be any portable electronic device including but not limited to a standalone display or monitor, a handheld computer, a tablet computer, a mobile phone, a police radio, a media player, a personal digital assistant (PDA), a GPS receiver, or the like, including a combination of two or more of these items. In this particular embodiment, device 103 preferably comprises a police radio containing a GPS receiver capable of determining a location of device 103. Since device 103 will be "assigned" to a particular officer, the location of device 103 can serve as a proxy for the location of officer 102. Device 103 is in communication with dispatch center 101 through intervening network 106.

Public-safety vehicle 104 may comprise such vehicles as a motorcycle, automobile, rescue vehicles, ladder trucks, ambulances, police cars, fire engines, . . . , etc. Vehicle 104 may be equipped with communication equipment that allows communication over network 106.

Network 106 may comprise one of any number of over-the-air or wired networks. For example network 106 may comprise a private 802.11 network set up by a building operator, a next-generation cellular communications network operated by a cellular service provider, or any public-safety network such as an APCO 25 network. Network 106 usually comprises several base station 120 that can receive information (either control or media, e.g., data, voice (audio), video, etc.) in a signal to/from vehicle 104 and device 103.

Area 100 may be depicted/displayed on device 103 (or any other device associated with officer 102) along with a current location of officer 102 (as determined by any device associated with officer 102) and the current location of vehicle 104 (as determined by vehicle 104). The actual content displayed on device 103 may be similar to that shown in FIG. 1.

During operation, officer 102 may leave vehicle 104 and patrol on foot. As described above, in certain situations, it may be advantageous for vehicle 104 to follow officer 102 as they perform their job. Additionally, there may be instances when having vehicle 104 follow officer 102 would be problematic. With this in mind, an incident identifier will be provided to the autonomous vehicle, and the autonomous vehicle will choose to "follow" the officer or not based on the incident identifier. Because the autonomous vehicle will only "follow" the officer for certain incident types, the officer will be able to perform many of their tasks without the annoyance of a vehicle following them.

Expanding on the above, during operation, dispatch center 101 will typically assign officer 102 a task. The task is associated with an incident identifier provided to officer 102 and vehicle 104. As one of ordinary skill in the art will recognize, the incident identifier typically comprises data (or a code, or numeric value) unique to a particular incident. For example, burglaries in progress may have a first identifier, while automobile accident may have a second identifier, and so forth. Network 106 is utilized to provide the incident identifier to both radio 103 and vehicle 104.

Radio 103 and vehicle 104 will also report their location periodically to dispatch center 101. Dispatch center 101 will relay the locations appropriately. For example, the location of radio 103 will be relayed to vehicle 104, and the location of vehicle 104 will be relayed to radio 103.

With the above in mind, both vehicle 104 and radio 103 will be "aware" of the current incident assigned to officer 102 along with the locations of vehicle 104 and radio 103. As discussed above, these locations may be displayed on a map shown on radio 103.

Vehicle 104 will then make a determination on whether or not to "follow" device 103 based on an incident identifier. For example, during foot chases, it may be beneficial for vehicle 104 to follow officer 102. The decision to "follow" will involve vehicle 104 determining to follow based on an incident identifier, determining a current location of vehicle 104, determining a current location of radio 103, and determining a best route to place vehicle 104 in the proximity of device 103. The determination of a best route may be accomplished via standard mapping software.

Figure 2:
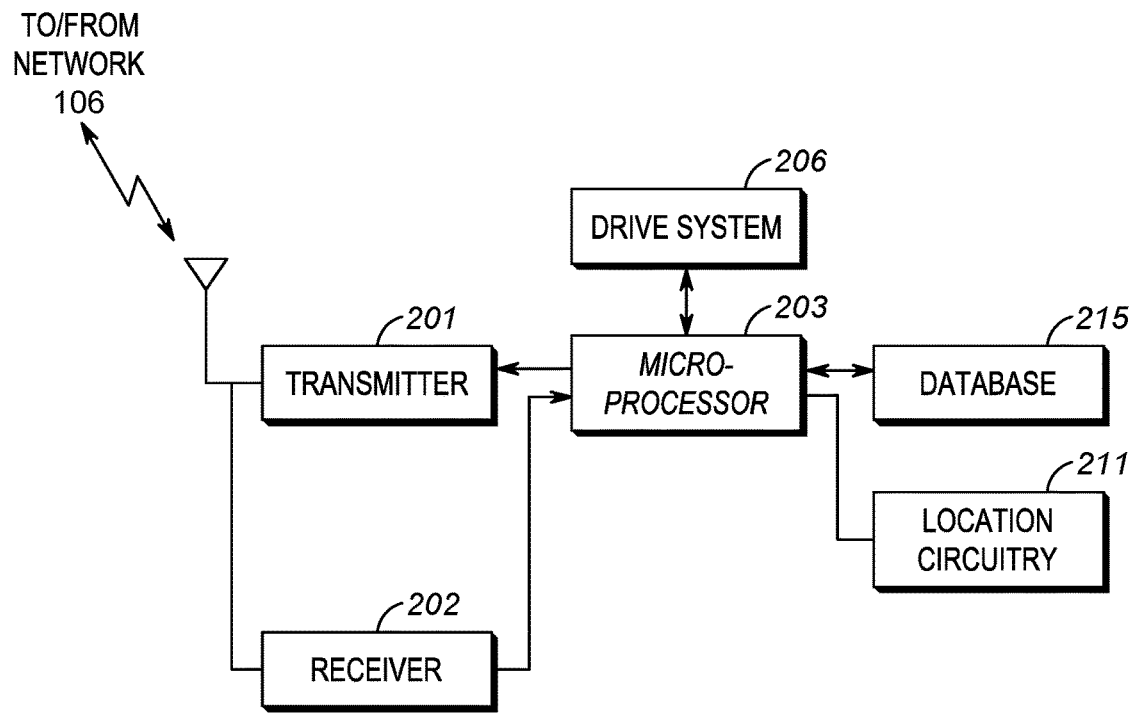
FIG. 2 is a block diagram of a vehicle as shown in FIG. 1.

FIG. 2 is a block diagram of a vehicle 104 as shown in FIG. 1. As shown, vehicle 104 may include transmitter 201, receiver 202, logic circuitry 203, database 215, memory 204, and location circuitry 211 (e.g., GPS receiver 211), and database 215. Transmitter 201 and receiver 202 may be well known long-range and/or short-range transceivers that utilize, for example, a public-safety network. Transmitter 201 and receiver 202 may also contain multiple transmitters and receivers, to support multiple communications protocols simultaneously. Drive system 206 preferably comprise standard vehicle parts (e.g., transmission, engine, wheels, steering, . . . , etc.) that together form a propulsion/steering system for vehicle 104. Logic circuitry 203 comprises a digital signal processor (DSP), general purpose microprocessor, a programmable logic device, or application specific integrated circuit (ASIC) and is utilized to determine whether or not to command vehicle 104 to follow officer 102.

Location circuitry 215 may comprise any device capable of generating a current location of vehicle 104. For example, location circuitry 211 may comprise a combination of a GPS receiver capable of determining a geographic location, a level sensor, a gyroscope, a compass, . . . , etc.

Database 215 preferably comprises standard random access memory and is used to store incident identifiers along with an associated action. For example, an incident identifier will be associated with a "follow" or "do not follow", and used by logic circuitry 203 to determine whether or not to follow officer 102.

Figure 3:
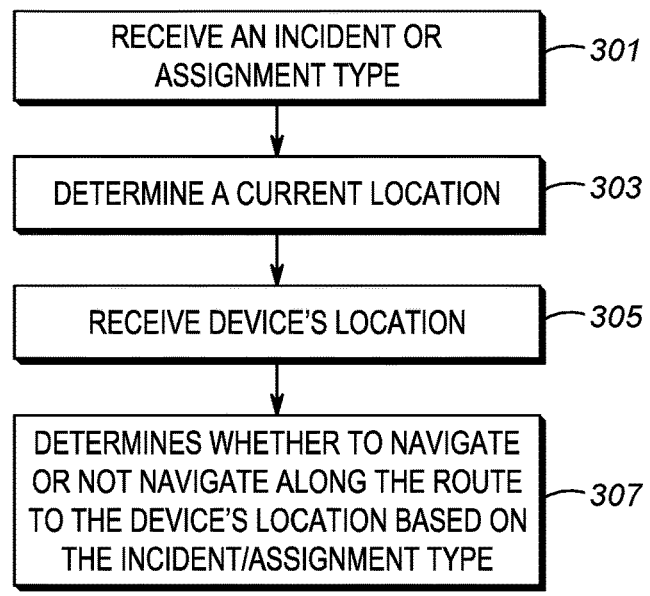
FIG. 3 is a flow chart showing operation of the vehicle of FIG. 2.

FIG. 3 is a flow chart showing operation of the vehicle of FIG. 2. More specifically, FIG. 3 shows the steps (not all necessary) for operating an autonomous vehicle in accordance with an embodiment of the present invention. The logic flow begins at step 301 where receiver 202 receives an incident or assignment type and passes this information to logic circuitry 203. As discussed above, the incident of assignment type preferably identifies a current public-safety incident assigned to a public-safety officer.

At step 303 location circuitry 211 determines a current location and passes the current location to logic circuitry 203. Receiver 202 also receives a device's location and passes the device's location to logic circuitry 203 (step 305). As discussed above, the device's location can be utilized as a proxy to determine a location of a public-safety officer.

Finally, at step 307 logic circuitry 203 determines whether to navigate or not navigate along the route to the device's location based on the incident/assignment type. It should be noted, that the step of navigating along the route to the device's location may comprise navigating to a rendezvous point near the device's location. This "rendezvous point" may be provided to the device by the vehicle through network 106.

In one embodiment of the present invention logic circuitry 203 can provide (via transmitter 201) the vehicle's location and the device's location to mapping software via transmitter 201, and receive a route from the current location to the device's location. In another embodiment of the present invention, logic circuitry 203 may determine the route itself by accessing mapping software stored, for example, in database 215. In either case, the step of "determining a route" is meant to encompass both receiving a route, or calculating a route.

As discussed above, the step of receiving the incident/assignment type may comprise the step of receiving the incident/assignment type at a receiver via an over-the-air communication. Additionally, the step of determining to navigate or not navigate based on the incident type may comprise the step of accessing memory 215 to determine whether or not to navigate. Finally, the step of determining the device's location comprises the step of receiving the device's location at receiver 202 via an over-the-air communication.

Figure 4:
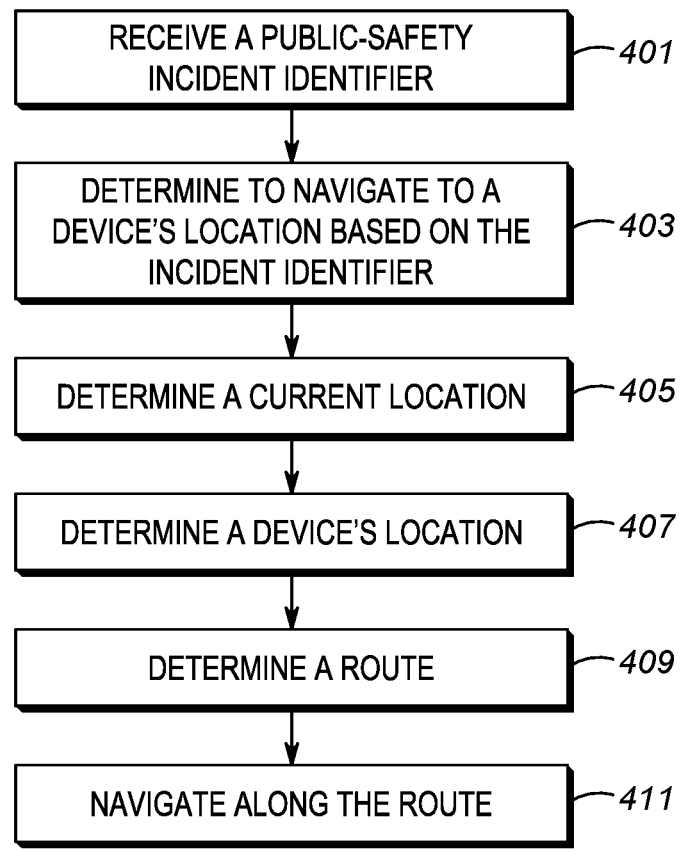
FIG. 4 is a flow chart showing operation of the vehicle of FIG. 2.

FIG. 4 is a flow chart showing operation of vehicle 104 of FIG. 2. More specifically, the logic flow of FIG. 4 illustrates those steps (not all necessary) for operating an autonomous vehicle. The logic flow begins at step 401 where receiver 202 receives a public-safety incident identifier or assignment type and passes the information to logic circuitry 203. Logic circuitry 203 then determines to navigate to a device's location based on the incident/assignment type (step 403). At step 405 logic circuitry instructs location circuitry 211 to determine a current location and provide the current location to logic circuitry 203. Logic circuitry also receives/determines the device's location via receiver 202 (step 407). Finally, logic circuitry 203 determines a route from the current location to the device's location (step 409). As discussed above, the step of "determining" a route may comprise providing necessary information to a service (such as Google Maps™) and receiving the route via over-the-air communication, or using internal software to determine the route. Regardless of how the route is determined, drive system 206 navigates from the current location to the devices location along the route (step 411).

As discussed, the step of receiving the public-safety incident or assignment type comprises the step of receiving the public-safety incident or assignment type at a receiver via an over-the-air communication. Additionally, the step of determining to navigate to the device's location based on the incident/assignment type comprises the step of accessing a memory to determine to navigate. Finally, the step of determining the device's location comprises the step of receiving the device's location at a receiver via an over-the-air communication.

As is evident, the vehicle shown in FIG. 2 comprises an over-the-air receiver 202 receiving a public-safety incident or assignment type and a device's location, location circuitry 211 determining a current location, logic circuitry 203 determining to navigate to the device's location based on the incident/assignment type and determining a route from the current location to the device's location. A drive system 206 is provided for navigating from the current location to the devices location along the route. A memory may be provided for storing public-safety incident or assignment types and information regarding whether or not to autonomously navigate for each public-safety incident or assignment type.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for operating an autonomous vehicle, the method comprising the steps of:
   receiving a public-safety incident/assignment identification identifying a type of public-safety incident or assignment;
   determining a current location;
   determining a public-safety officer's location; and
   determining to autonomously navigate a vehicle along a route to the public-safety officer's based on the public-safety incident/assignment identification.

2. The method of claim 1 further comprising the step of:
determining the route to the public-safety officer's location.

3. The method of claim 1 wherein the step of receiving the public-safety incident/assignment identification comprises the step of receiving the public-safety incident/assignment identification at a receiver via an over-the-air communication.

4. The method of claim 1 wherein the step of determining to autonomously navigate the vehicle the vehicle based on the public-safety incident/assignment identification comprises the step of accessing a memory to determine whether or not to autonomously navigate the vehicle.

5. The method of claim 1 wherein the step of determining the public-safety officer's location comprises the step of receiving the public-safety officer's location at a receiver via an over-the-air communication.

6. A method for operating an autonomous vehicle, the method comprising the steps of:
receiving a public-safety incident or assignment type identifying a type of public-safety incident or assignment;
determining to autonomously navigate a vehicle to a public-safety officer's location based on the public-safety incident or assignment type;
determining a current location;
determining the public-safety officer's location;
determining a route from the current location to the public-safety officer's location; and
navigating along the route from the current location to the devices location near the public-safety officer's location.

7. The method of claim 6 wherein the step of receiving the public-safety incident or assignment type comprises the step of receiving the public-safety incident or assignment type at a receiver via an over-the-air communication.

8. The method of claim 6 wherein the step of determining to autonomously navigate the vehicle to the public-safety officer's location based on the incident/assignment type comprises the step of accessing a memory to determine to autonomously navigate the vehicle.

9. The method of claim 6 wherein the step of determining the public-safety officer's location comprises the step of receiving the public-safety officer's location at a receiver via an over-the-air communication.

10. A vehicle comprising:
an over-the-air receiver receiving a public-safety incident or assignment type and a public-safety officer's location;
location circuitry determining a current location;
logic circuitry determining to autonomously navigate a vehicle to the public-safety officer's location based on the incident/assignment type, determining a route from the current location to the public-safety officer's location; and
a drive system navigating along the route from the current location to the devices location near the public-safety officer's location.

11. The apparatus of claim 10 further comprising:
a memory storing public-safety incident or assignment types and information regarding whether or not to autonomously navigate the vehicle for each public-safety incident or assignment type.

* * * * *